US011556800B2

(12) United States Patent
Yu et al.

(10) Patent No.: US 11,556,800 B2
(45) Date of Patent: Jan. 17, 2023

(54) DECIPHERABLE DEEP BELIEF NETWORK METHOD OF FEATURE IMPORTANCE ANALYSIS FOR ROAD SAFETY STATUS PREDICTION

(71) Applicant: The Chinese University of Hong Kong, Hong Kong (CN)

(72) Inventors: Ming Yu, Hong Kong (CN); Guangyuan Pan, Shenzhen (CN); Ying Zhang, Ontario (CA)

(73) Assignee: The Chinese University of Hong Kong, Hong Kong (CN)

( * ) Notice: Subject to any disclaimer, the term of this patent is extended or adjusted under 35 U.S.C. 154(b) by 400 days.

(21) Appl. No.: 16/815,847

(22) Filed: Mar. 11, 2020

(65) Prior Publication Data
US 2021/0287100 A1 Sep. 16, 2021

(51) Int. Cl.
*G06N 3/08* (2006.01)
*G06N 3/04* (2006.01)
*G08G 1/01* (2006.01)
*G06F 17/18* (2006.01)

(52) U.S. Cl.
CPC ............... *G06N 3/088* (2013.01); *G06N 3/04* (2013.01); *G06N 3/0445* (2013.01); *G06N 3/08* (2013.01); *G08G 1/0133* (2013.01); *G06F 17/18* (2013.01)

(58) Field of Classification Search
CPC ........ G06N 3/088; G06N 3/04; G06N 3/0445; G06N 3/08; G06N 3/0454; G06N 3/0472; G06N 3/084; G08G 1/0133; G08G 1/0104; G06F 17/18
See application file for complete search history.

(56) References Cited

PUBLICATIONS

Pan et al. (Development of a Global Road Safety Performance Function Using Deep Neural Networks), Aug. 2017, Science Direct https://www.sciencedirect.com/science/article/pii/S2046043017300199#f0005 (Year: 2017).*
Chen et al. (A Survey on an Emerging Area: Deep Learning for Smart City Data), Oct. 2019, IEEE https://ieeexplore.ieee.org/document/8704334?source=IQplus (Year: 2019).*

(Continued)

*Primary Examiner* — Yogeshkumar Patel
(74) *Attorney, Agent, or Firm* — Saliwanchik, Lloyd & Eisenschenk

(57) ABSTRACT

A method for visualizing and analyzing contributions of various input features for traffic safety status prediction is provided. The method includes initializing a deep belief network (DBN) with input features; performing unsupervised learning/training by observing changes of weights of the input features during the unsupervised learning/training; when the unsupervised learning/training process is complete, performing supervised learning/training process by generating a reconstructed input layer based on results of each hidden layer; and continually running the supervised learning/training and generating a weight diagram based on both visualization and numerical analysis that calculates contributions of the input features. The input features may include one or more of annual average daily commercial traffic (AADCT), median width, left shoulder width, right shoulder width, curve deflection, and exposure for traffic safety status prediction.

20 Claims, 13 Drawing Sheets

(56) References Cited

PUBLICATIONS

Hohman, F. et al., "SUMMIT: Scaling Deep Learning Interpretability by Visualizing Activation and Attribution Summarizations," *IEEE Transactions on Visualization and Computer Graphics*, Aug. 2019, pp. 1-12.

Pan, G. et al., "Development of a global road safety performance function using deep neural networks," *International Journal of Transportation Science and Technology*, 2017, 6:159-173, Tongji University and Tongji University Press.

Samek, W. et al., "Evaluating the visualization of what a Deep Neural Network has learned," *IEEE Transactions on Neural Networks and Learning Systems*, Sep. 21, 2015, pp. 1-13.

Samek, W. et al., "Explainable Artificial Intelligence: Understanding, Visualizing and Interpreting Deep Learning Models." *ITU Journal: ICT Discoveries*, Aug. 28, 2017, 1:1-8.

Shrikumar, A. et al., "Learning Important Features Through Propagating Activation Differences," *arXiv preprint*, Oct. 12, 2019, pp. 1-9.

Carvalho, D. V. et al., "Machine Learning Interpretability: A Survey on Methods and Metrics," *Electronics*, 2019, 8(832):1-34.

Shwartz-Ziv, R. et al., "Opening the Black Box of Deep Neural Networks via Information," *arXiv preprint*, Mar. 2, 2017, pp. 1-10.

Tjoa, E. et al., "A Survey on Explainable Artificial Intelligence (XAI): towards Medical XAI," *arXiv*, 2019, pp. 1-16.

Papernot, N. et al., "Practical Black-Box Attacks against Deep Learning Systems using Adversarial Examples," *Proceedings of the 2017 ACM Asia Conference on Computer and Communications Security*, Nov. 7, 2016, pp. 1-16.

Lee, Y. et al., "PRETZEL: Opening the Black Box of Machine Learning Prediction Serving Systems," $13^{13}$ *USENIX Symposium on Operating Systems Design and Implementation*, Oct. 14, 2018, pp. 1-17.

Honegger, M. R. et al., "Shedding Light on Black Box Machine Learning Algorithms Development of an Axiomatic Framework to Assess the Quality of Methods that Explain individual Predictions," *arXiv*, Aug. 15, 2018, pp. 1-93.

Narodytska, N. et al., "Simple Black-Box Adversarial Attacks on Deep Neural Networks," *IEEE Conference on Computer Vision and Pattern Recognition Workshops (CVPRW)*, Aug. 24, 2017, pp. 1-9.

Guidotti, R. et al., "A Survey of Methods For Explaining Black Box Models," *ACM Computing Surveys*, Jun. 21, 2018, pp. 1-46.

Lecun, Y. et al., "Deep learning," *Nature*, May 28, 2015, 521:436-444, Macmillan Publishers Limited.

Hohman, F. et al., "Visual Analytics in Deep Learning: An Interrogative Survey for the Next Frontiers," *IEEE Transactions on Visualization and Computer Graphics*, May 14, 2018, pp. 1-21.

Du, M. et al., "Techniques for Interpretable Machine Learning," *Communications of the ACM*, May 19, 2019, pp. 1-9.

Thiagarajan, J. J. et al., "TreeView: Peeking into Deep Neural Networks Via Feature-Space Partitioning," $30^{th}$ *Conference on Neural Information Processing Systems (NIPS 2016)*, Nov. 22, 2016, pp. 1-5.

Zeiler, M. D. et al., "Visualizing and Understanding Convolutional Networks," *ECCV*, 2014, pp. 818-833, Springer International Publishing Switzerland.

Koh, P. W. et al., "Understanding Black-box Predictions via Influence Functions," *Proceedings of the $34^{th}$ International Conference on Machine Learning*, 2017, pp. 1-10.

Bojarski, M. et al., "VisualBackProp: visualizing CNNs for autonomous driving," *arXiv*, Nov. 16, 2016, pp. 1-12.

Adadi, A. et al., "Peeking Inside the Black-Box: A Survey on Explainable Artificial Intelligence (XAI)," *IEEE Access*, 2018, 6:52138-52160, IEEE.

\* cited by examiner (a) weights change in fine-tuning

Feature1

Feature2

Feature3

Feature4

Feature5

Feature6

DECIPHERABLE DEEP BELIEF NETWORK METHOD OF FEATURE IMPORTANCE ANALYSIS FOR ROAD SAFETY STATUS PREDICTION

BACKGROUND OF THE INVENTION

The evaluation of safety effects of countermeasures for road safety relies greatly on collision prediction methods including safety performance functions (SPF). Generally, the safety performance functions are separately developed for different types of highways or entities and using data locally collected from the study area representing the specific highway types to be modelled. Although these traditional methods are easy to understand and apply, they suffer from the problem of low accuracy in the predicted results thanks to the random nature of collision occurrences and the strong distribution assumption.

Among the SPF analysis using data-driven and nonparametric methods, those based on deep learning (also known as deep neural networks) are often considered the most promising techniques. However, one of the greatest challenges in applications of the deep-learning based analysis is the unanalyzable learning/training process, because the learning mechanisms are hidden in a "black box" of the deep learning. As a result, traffic features extraction and intelligent importance analysis are difficult to generate.

BRIEF SUMMARY OF THE INVENTION

There continues to be a need in the art for improved designs and techniques for a visual feature importance method for traffic safety prediction.

Embodiments of the subject invention pertain to a visual feature importance method based on deep belief network for visualizing and analyzing contributions of various input features.

According to an embodiment of the subject invention, a method for visualizing and analyzing contributions of various input features for traffic safety status prediction can comprise steps of initializing a deep belief network (DBN) with input features; performing unsupervised learning/training process by observing changes of weights of the input features during unsupervised learning/training process; when the unsupervised learning/training process is complete, performing supervised ("fine-tuning") learning/training process by generating a reconstructed input layer based on each hidden layer; and continually running the supervised ("fine-tuning") learning/training process and generating a weights diagram based on both visualization and numerical analysis that calculates contributions of the input features. The initializing a deep belief network (DBN) can comprise pre-setting the DBN with a V-H1-H2-O structure wherein V represents input neurons, H1 and H2 represent hidden neurons in two hidden layers, respectively, and O represents output for prediction, and wherein weights are randomly pre-set. The observing changes of weights during unsupervised learning/training process is performed with a focus on magnitude of each input feature. The performing unsupervised learning/training process comprises training a first restricted Boltzmann (RBM) machine comprising the input neurons V and the hidden neurons in the first hidden layer H1 based on greedy unsupervised learning/training process. The generating a reconstructed input layer based on each hidden layer is performed by differentiating the activation area and non-activation area. Moreover, the supervised ("fine-tuning") learning/training process comprises generating a diagram of the weights such that whether a secondary consideration of the method is determined to exist after it is taught by a teacher. If the secondary consideration is determined to exist, a resulting image that is different from a resulting image of the unsupervised learning/training process is generated. The numerical analysis that calculates contributions of input features determines whether the input feature is accepted or rejected. When the performing unsupervised learning/training process or the performing supervised ("fine-tuning") learning/training process is complete, results of the learning/training process are evaluated based on a mean absolute error (MAE) and a root mean square error (RMSE). Furthermore, the input features can comprise one or more of annual average daily commercial traffic (AADCT), median width, left shoulder width, right shoulder width, curve deflection, and exposure for traffic safety status prediction.

In certain embodiment of the subject invention, a non-transitory computer-readable medium can comprise program instructions stored thereon that, when executed, cause a processor to perform a method for visualizing and analyzing contributions of various input features for traffic safety status prediction. The method comprises steps of initializing a deep belief network (DBN) with input features; performing unsupervised learning/training process by observing changes of weights of the input features during unsupervised learning/training process; when the unsupervised learning/training process is complete, performing supervised ("fine-tuning") learning/training process by generating a reconstructed input layer based on each hidden layer; and continually running the supervised ("fine-tuning") learning/training process and generating a weights diagram based on both visualization and numerical analysis that calculates contributions of the input features. The initializing a deep belief network (DBN) can comprise pre-setting the DBN with a V-H1-H2-O structure wherein V represents input neurons, H1 and H2 represent hidden neurons in two hidden layers, respectively, and O represents output for prediction, and wherein weights are randomly pre-set. The observing changes of weights during unsupervised learning/training process is performed with a focus on magnitude of each input feature. The performing unsupervised learning/training process comprises training a first restricted Boltzmann (RBM) machine comprising the input neurons V and the hidden neurons in the first hidden layer H1 based on greedy unsupervised learning/training process. The generating a reconstructed input layer based on each hidden layer is performed by differentiating the activation area and non-activation area. Moreover, the supervised ("fine-tuning") learning/training process comprises generating a diagram of the weights such that whether a secondary consideration of the method is determined to exist after it is taught by a teacher. If the secondary consideration is determined to exist, a resulting image that is different from a resulting image of the unsupervised learning/training process is generated. The numerical analysis that calculates contributions of input features determines whether the input feature is accepted or rejected. When the performing unsupervised learning/training process or the performing supervised ("fine-tuning") learning/training process is complete, results of the learning/training process are evaluated based on a mean absolute error (MAE) and a root mean square error (RMSE). Furthermore, the input features can comprise one or more of annual average daily commercial traffic (AADCT), median width, left shoulder width, right shoulder width, curve deflection, and exposure for traffic safety status prediction.

DETAILED DISCLOSURE OF THE INVENTION

Figure 1A:
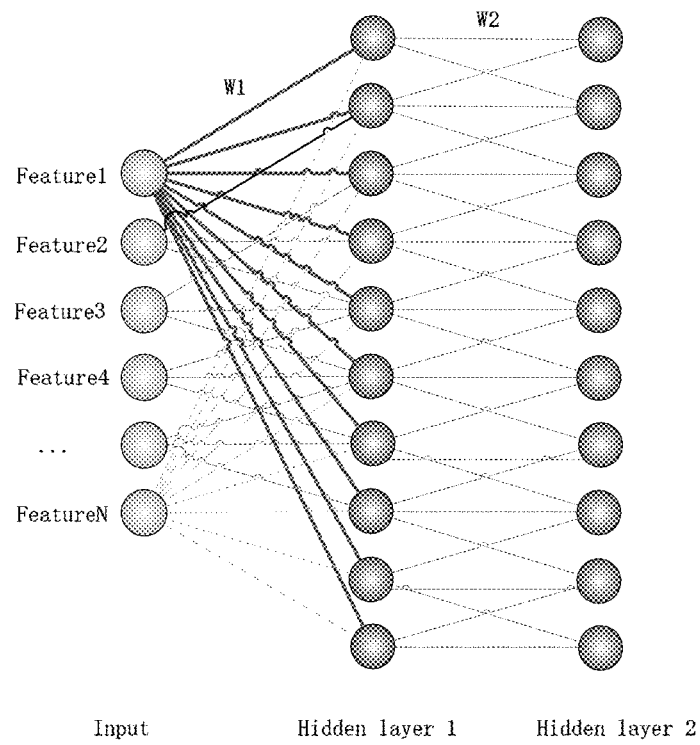
FIG. 1A shows visualization of changes of weights of input features of a method for analyzing contributions of various input features for traffic safety status prediction, according to an embodiment of the subject invention.

The embodiments of the subject invention pertain to a visual feature importance (ViFI) method built on feature importance evaluation and visualization for performing sensitivity analysis and presenting diagrams based on the results of the analysis. As a result, better understanding of the learning/training process is obtained to provide effective evaluation of contributions of various input features on black box features of the learning/training process, allowing improved output decisions for road safety status prediction.

The ViFI method can be based on decipherable deep belief network performing both a unsupervised learning/training process and a supervised ("fine-tuning") learning/training process to assess importance of each input feature.

In some embodiments of the subject invention, the ViFI method can be divided into four steps as described below:

1) initializing a deep belief network (DBN) structure with learning/training parameters;

2) observing changes of weights during the unsupervised learning/training process, focusing primarily on magnitudes of each input feature;

3) when the unsupervised learning/training process is complete, generating a reconstructed input layer utilizing each hidden layer, and by showing the activation and non-activation areas, obtaining better understanding of the knowledge learned;

4) continually performing the supervised ("fine-tuning") learning/training step and generate the weights diagram based on both the visualization and the numerical analysis that calculates the contribution of input features that is either accepted or rejected.

In the first step, the weights are randomly pre-set for a given deep belief network with a V-H1-H2-O structure, wherein V represents input neurons, H1 and H2 represent hidden neurons in two hidden layers, respectively, and O represents output for prediction.

In the second step, a first restricted Boltzmann machine (RBM) including V and H1 is trained based on a greedy unsupervised learning/training process. The feature learning/training process and the weights updating process can be described by Equations (1)-(6) below.

$$V^0 = V \tag{1}$$

$$H^0 = p(h_j) = \frac{1}{1 + e^{-b_j - \sum_i v_i w_{ij}}} \tag{2}$$

$$V^1 = p(v_i) = \frac{1}{1 + e^{-b_j - \sum_j h_j w_{ji}}} \tag{3}$$

$$H^1 = p(h_j) = \frac{1}{1 + e^{-b_j - \sum_i v_i w_{ij}}} \tag{4}$$

$$\Delta W = <V^0 \cdot H^0> - <V^1 \cdot H^1> \tag{5}$$

$$W^{t+1} = W^t + \Delta W \tag{6}$$

Equation (1) represents the starting state of input data (values between 0 and 1), with weights W between the two layers randomly given (all zeros are preferred for easier calculation in the following steps). $v_i$ and $h_j$ are neurons in V and H1. Equations (2)-(4) are the feature learning/training equations of the RBM. Particularly, $V^0$, $H^0$, $V^1$, and $H^1$ are the four states recorded during transformation. p( ) is the probability of a neuron being activated, $w_{ij}$ is the weight between i in V and j in H1, and b and c are the biases.

Moreover, the weights are updated by applying Equations (5)-(6). As the weights are all initialized to be zero at the beginning, in the unsupervised learning/training process if a feature is determined to be important, the weights between the specific feature neuron and hidden layer 1 will be strengthened, leading to a negative $\alpha\Delta W$ in Equation (5) since more neurons will have a value of 1 in $V^1$ and $H^1$. If a feature is determined to be unimportant by the learning/training process, the $\Delta W$ will be set to a positive value, and since the $V^1$ and the $H^1$ are mostly 0, values of the $W^{t+1}$ will keep increase.

Referring to FIG. 1A, the visualization of change of weights of input features of the ViFI method is illustrated for analyzing contributions of various input features. When the unsupervised learning/training process is complete, results of a first impression on each input feature are generated. The blue lines of FIG. 1A indicate that the weights are strengthened if it is determined to be an important feature, otherwise it is determined to be an unimportant feature and the connections are weakened which are indicated by the orange lines of FIG. 1A.

Figure 1B:
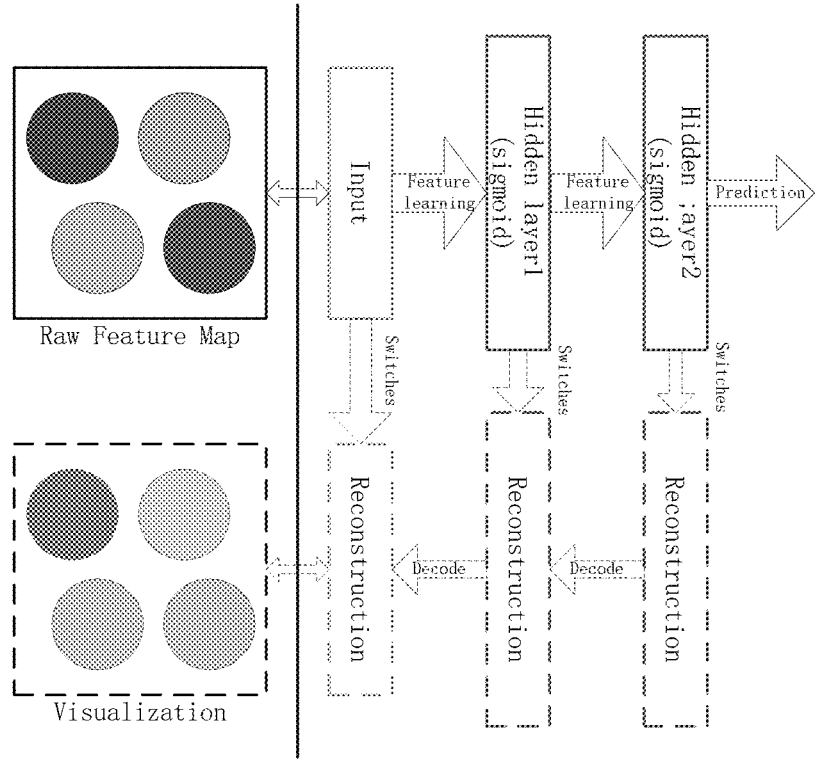
FIG. 1B shows visualization of layer reconstruction, in which a decoding function is the same as a coding function, according to an embodiment of the subject invention.

In FIG. 1B, the visualization of layer reconstruction in which a decoding function is the same as a coding function is shown. When the unsupervised learning/training process is complete, a reconstructed input using each layer is generated. It is noted that by performing the second step, the reconstructed data can highlight the truly important features, obtaining the knowledge that the hidden layers have learned.

In the third step, the supervised ("fine-tuning") learning/training process is performed in which the same method of step 2 is then applied to produce a diagram for the weights.

This process allows a determination of any secondary considerations the method uses after it is taught by a teacher. If these considerations exist, the resulting image would be different from the resulting image obtained from the unsupervised learning/training image. The supervised ("fine-tuning") learning/training process is described by Equations (7)-(10) below, $$E_W = \frac{1}{2T}\sum_{t=1}^{T}(O_{target} - O_{observed})^2 \qquad (7)$$

$$\frac{\partial E_W}{\partial W_k} = \frac{\partial E_W}{\partial O_n} \cdot \frac{\partial O_n}{\partial H_{n-1}} \cdot \frac{\partial H_{n-1}}{\partial O_{n-2}} \cdots \frac{\partial H_k}{\partial W_k} \qquad (8)$$

$$\Delta W = \alpha \frac{\partial E_W}{\partial W_k} \qquad (9)$$

$$W_k^{t+1} = W_k^t - \Delta W \qquad (10)$$

wherein, $E_W$ is the objective function used in a backpropagation network which calculates the error between the target output $O_{target}$ and observed output $O_{observed}$; T is the testing set; n is the number of layers, thereby $O_n$ is the output of the whole network, $O_n = O_{observed}$; and $H_k$ is the vector value of layer k.

When the supervised ("fine-tuning") learning/training process is complete, the changes of weights between hidden layer 1 and the input are exported along with the diagram. By applying Equation (10), an increase of the weights is indicated as a negative $\Delta W$.

In the forward process, a sigmoid transfer function, $$p(h_0) = \frac{1}{1 + e^{-b_j - \sum_i v_0 w_{ij}}},$$

is applied to represent data flow from input to hidden layer 1. This function is ascending and all values of input and hidden layer units are over 0. As a result, bigger weights would lead to bigger p( ). Assuming that the ViFI method is not over-fitted, the bigger p( ) values are preferred as they suggest that the connections to the input feature are significant. On the other hand, if the weights decrease, the feature that they are connected to may be unimportant. These features may be different from the ones that a user of the ViFI method would identify as important, because an artificial intelligence (AI) method may learn differently from human beings.

The mean value of the weights on each feature is then calculated based on the results of the unsupervised learning/training process and the results of the supervised ("fine-tuning") learning/training process. Since Equation (6) which is a weight updating equation is linear, the contributions of the feature learning/training process are defined based on a linear function shown in Equations (11)-(13) below, in which $Fl_i$ is the importance of feature i, $Fl_i^{unsup}$ indicates importance of i in the unsupervised learning/training and $Fl_i^{sup}$ is the importance after fine-tuning. $w_i^n$ represents the weights that connect to i in epoch n, V represents a number of features and H represents a number of hidden units.

$$Fl_i = Fl_i^{unsup} + Fl_i^{sup} \qquad (11)$$

$$Fl_i^{unsup} = \Sigma w_i^0 - \Sigma w_i^n / H \qquad (12)$$

$$Fl_i^{sup} = 1/1 + e - (\Sigma w_i^n - \Sigma w_i^0 / H) \qquad (13)$$

In the fourth step, the supervised ("fine-tuning") learning/training step is continually performed and the weights diagram is generated based on the visualization and the numerical analysis that calculates the contribution of input features, the input feature being determined to be either accepted or rejected.

The ViFI method allows effective deciphering of the method's inner workings and allows the important/significant features to be identified and the unimportant/bad features to be eliminated. Subsequently, the revised dataset can be applied to the ViFI method in crash and vehicle collision prediction for improving road traffic safety.

Experiment 1:

In this exemplary experiment, the historical data from Highway 401, a multilane-access controlled highway in Ontario, Canada are used. The highway is one of the busiest highways in North America and connects Quebec in the east and the Windsor-Detroit international border in the west. Approximately 800 km of the total length of 817.9 km of the highway was selected for the experiment. According to 2008's traffic volume data, the annual average daily traffic ranges from 14,500 to 442,900, indicating a relatively busy road corridor.

The processed crash and traffic data of this experiment are integrated into a single dataset with homogenous sections and having a total of 3,762 records with the year being used as the mapping fields. The six input features of the dataset are annual average daily commercial traffic (AADCT), median width, left shoulder width, right shoulder width, curve deflection, and exposure.

The description of continuous input features is summarized in Table 1 which includes the sample sizes for learning/training and testing. After the learning/training process is complete, the performance of each method is estimated based on mean absolute error (MAE) and root mean square error (RMSE), as defined by Equations (14)-(15) below.

$$MAE = \frac{\sum_{i=1}^{n}|O_{target} - O_{observed}|}{n} \qquad (14)$$

$$RMSE = \sqrt{\frac{\sum_{i=1}^{n}(O_{target} - O_{observed})^2}{n}} \qquad (15)$$

TABLE 1

Summary of the dataset (Highway 401, Ontario)

| Variables | Mean | Max | Min | St. dev. | Sample size |
|---|---|---|---|---|---|
| Collisions (per year) | 23.81 | 468 | 0 | 50.02 | Total: 3762 |
| AADT (veh/day) | 76633 | 442900 | 12000 | 91476 | (year 2000-2008) |
| Segment Length (km) | 1.95 | 12.7 | 0.2 | 2.06 | Training: 2926 |

TABLE 1-continued

Summary of the dataset (Highway 401, Ontario)

| Variables | Mean | Max | Min | St. dev. | Sample size |
|---|---|---|---|---|---|
| AADCT (veh/day) | 13993 | 42076 | 0 | 6719 | (year 2000-2006) |
| Median width (m) | 11.11 | 30.5 | 0.6 | 6.14 | Testing: 836 |
| Shoulder width-right (m) | 3.14 | 4 | 2.6 | 0.28 | (year 2007-2008) |
| Curve deflection (per km) | 0.19 | 1.86 | 0 | 0.35 | |
| Shoulder width-left (m) | 1.6 | 5.19 | 0 | 1.19 | |

In Equations (16)-(20):

$$y_j = \varphi_j\left(\sum_j w_{ij}x_i + \sigma \cdot N_j(0, 1)\right) \quad (16)$$

$$x_i = \varphi_i\left(\sum_j w_{ij}y_j + \sigma \cdot N_i(0, 1)\right) \quad (17)$$

$$\varphi(X) = \theta_L + (\theta_H - \theta_L) \cdot \frac{1}{1 + e^{-a_i X}} \quad (18)$$

$$F_W = \alpha E_W + \beta R_W \quad (19)$$

$$R_W = \frac{1}{I \cdot J}\sum_{j=1}^{J}\sum_{i=1}^{I} w_{ij}^2 \quad (20)$$

$x_i$ and $y_j$ are the continuous values of unit i and j in two layers; $w_{ij}$ is the weight between them; N(0,1) is a Gaussian random variable with mean 0 and variance 1; σ is a constant; φ(X) denotes a sigmoid-like function with asymptote of $\theta_H$ and $\theta_L$; α is a variable that controls noise; $F_W$ is the new optimization function in fine-tuning; $R_W$ is the Bayesian regularization item for inhibiting over-fitting by controlling the values of weights; and α and β are performance parameters that can be calculated during the iteration.

An embodiment of the ViFI method of the subject invention was first performed based on the unsupervised learning/training process. The method was initialized with six input neurons, one for each feature, namely, exposure, AADCT, left shoulder width, median width, right shoulder width, and curve deflection; two hidden layers with ten neurons in each layer, and one output layer that contains only one neuron for vehicle collision prediction.

The weights between input and hidden layer 1 can be written as, $$W1 = (w_{11}, w_{12}, \ldots, w_{1\ 10}, w_{21}, \ldots, w_{ij}, w_{61}, \ldots, w_{6\ 10}),$$

where i (from 1 to 6) and j (from 1 to 10) are neurons in the two layers. A visualization of the structure that highlights how the weights form the different connections between layers and how they are updated is illustrated in FIGS. 2A and 2B.

Figure 2A:
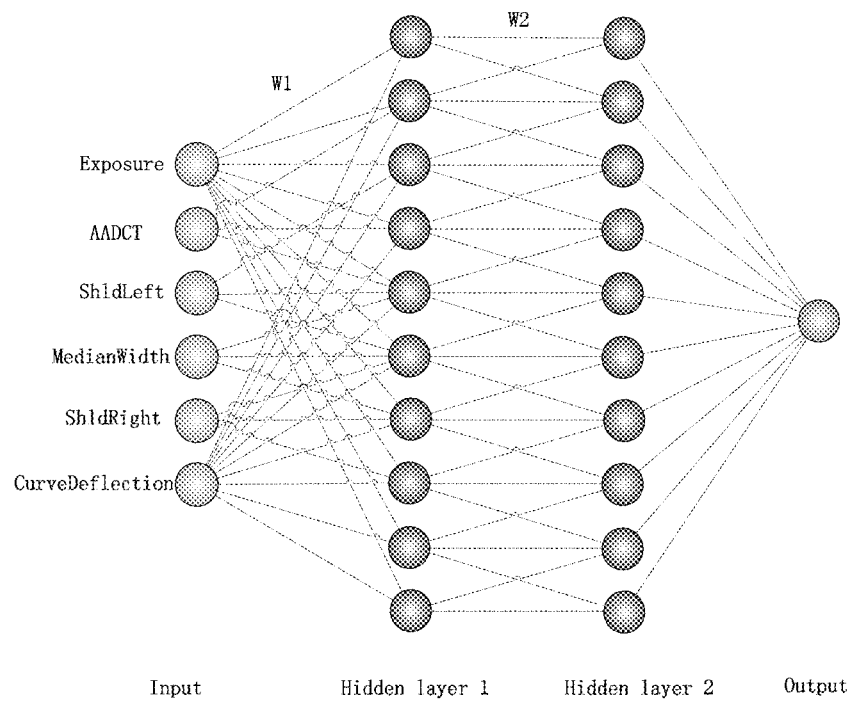
FIG. 2A shows a structure of the method being used in an exemplary experiment, according to an embodiment of the subject invention.
Figure 2B:
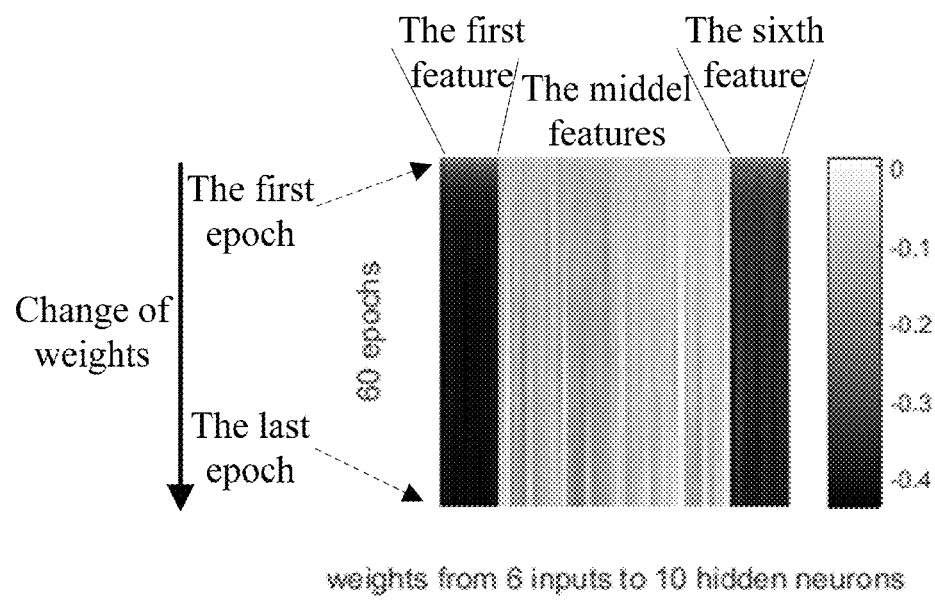
FIG. 2B shows trained weights W1 from input to hidden layer 1 during 60 epochs of the unsupervised learning/training process, with each row representing the weights in one epoch, according to an embodiment of the subject invention.

FIG. 2A shows a structure of the ViFI method being used in an exemplary experiment. FIG. 2B illustrates trained weights W1 (from input to hidden layer 1 in FIG. 2B) during 60 epochs of the unsupervised learning/training process, with each row representing the weights in an epoch. Moreover, in FIG. 2B, the top row represents the first epoch and the bottom last row represents the sixtieth epoch. As the weights are set to be zero at the initialization, the color is all white at the initialization. The vertical direction shows the changes of the weights. During the unsupervised learning/training process, some weights become very dark in the vertical direction while others are not so much.

According to the analysis described above, the darker the color is, the more important the feature is. The more important a feature is, the more knowledge the hidden layer needs to learn, thus the bigger the difference will be. Therefore, it is noted that all features may be regarded as important in the unsupervised learning/training process, especially the features of exposure and curve flection represented by the input neurons 1 and 6, respectively.

Subsequently, the Equation (14) was applied to the hidden layer to reconstruct the input data. By comparisons, the patterns of the reconstructed features from the two hidden layers are determined to be similar, suggesting similar or equal feature learning/training ability.

Then the supervised ("fine-tuning") learning/training process is performed for about 5,000 iterations of learning/training. The changes of weights between the input layer and the hidden layer 1 are visualized in FIG. 3A and can be compared with the results of FIG. 2B.

Figure 3A:
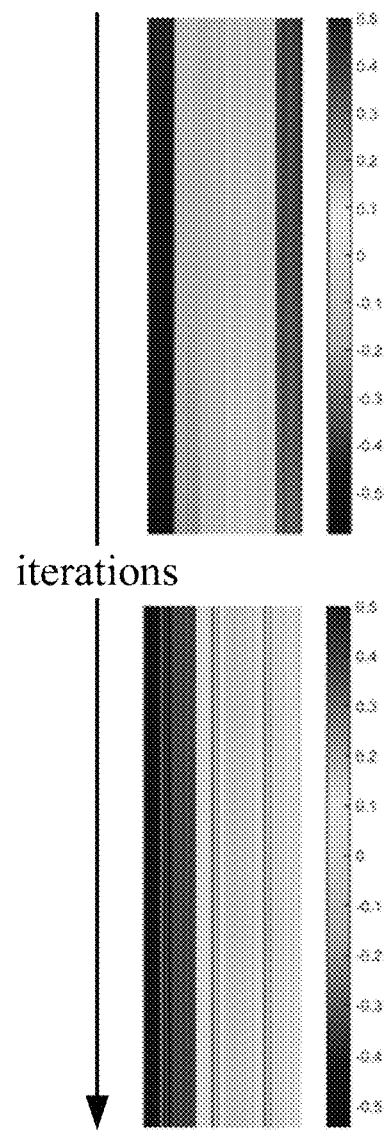
FIG. 3A shows the changes of weights between input and hidden layer 1 and weights that connect to each feature, according to an embodiment of the subject invention.
Figure 3B:
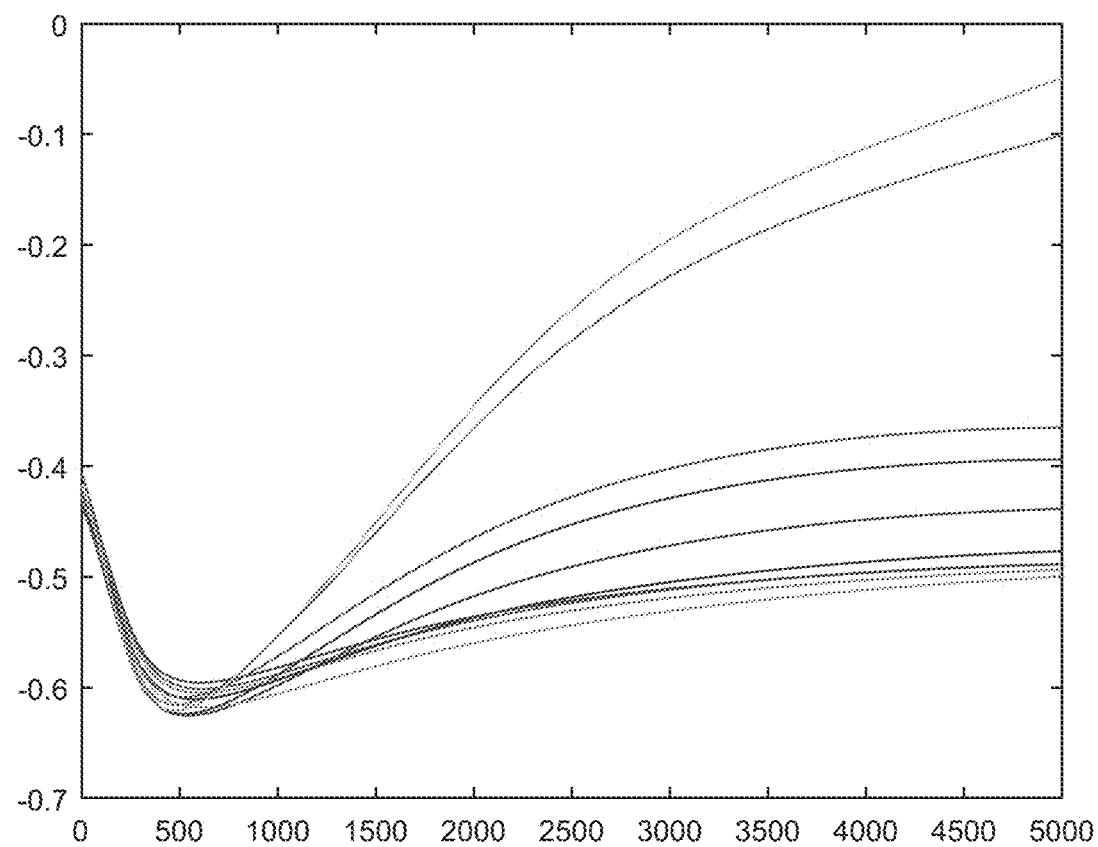
FIG. 3B shows that the first feature's weights slightly decrease at first and then increase, the second feature's weights keep decreasing, the third and fourth features increase at first then fall a little, weights of features five and six increase all the time, according to an embodiment of the subject invention.
Figure 3B:
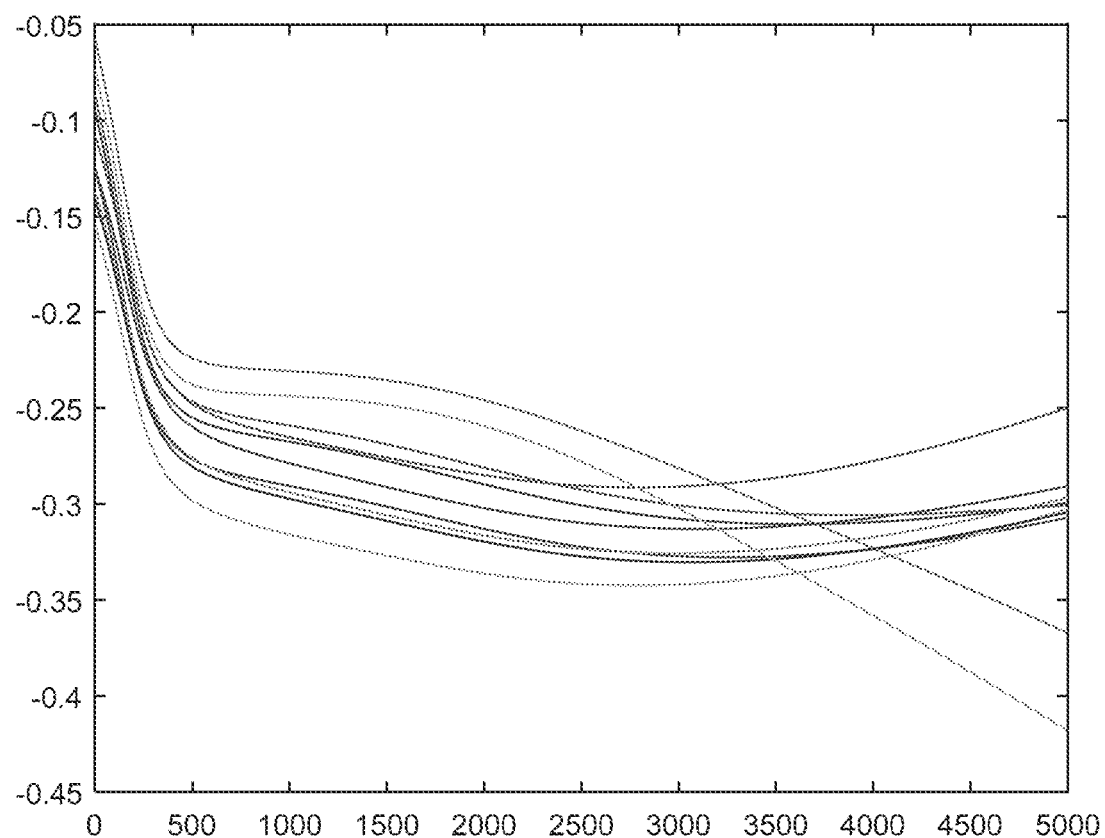
Figure 3B:
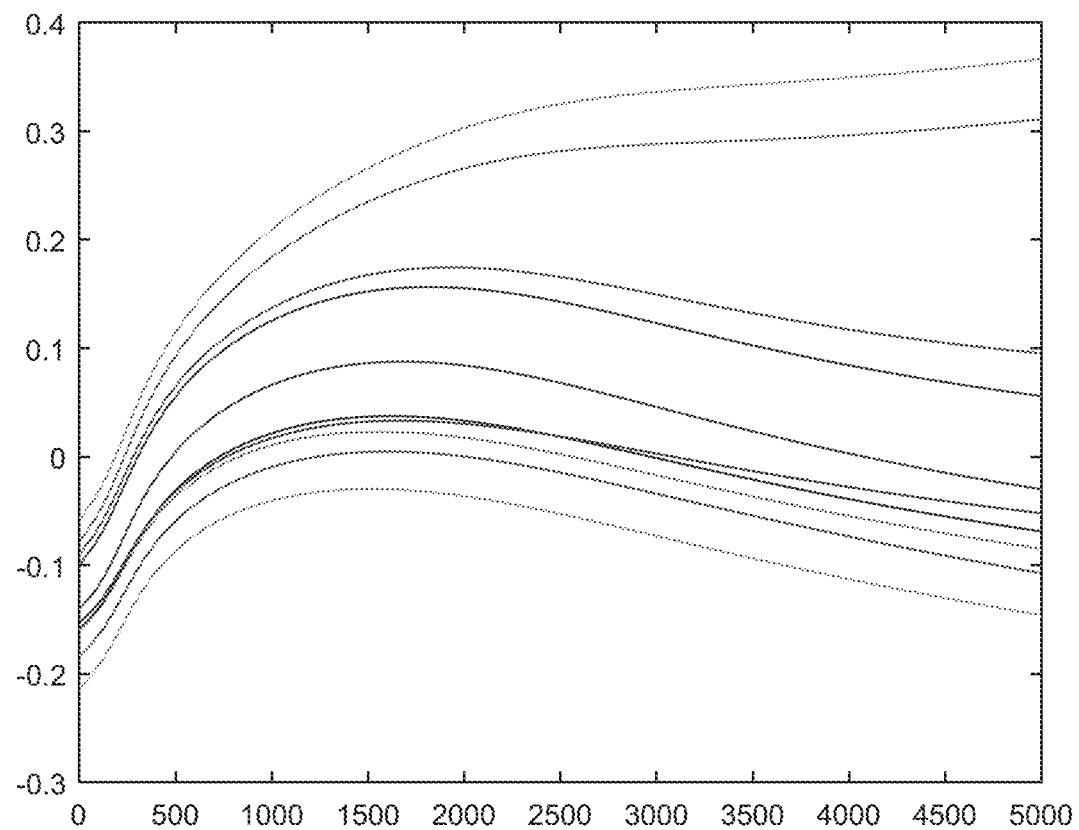
Figure 3B:
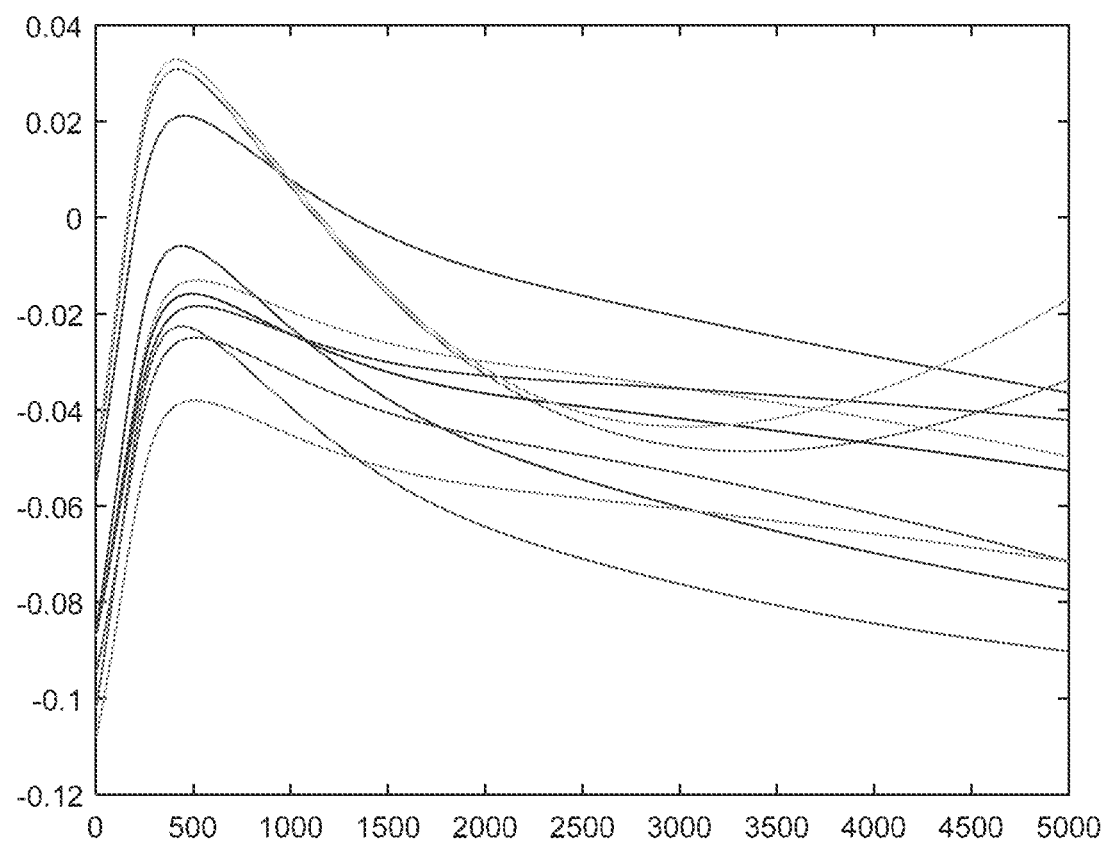
Figure 3B:
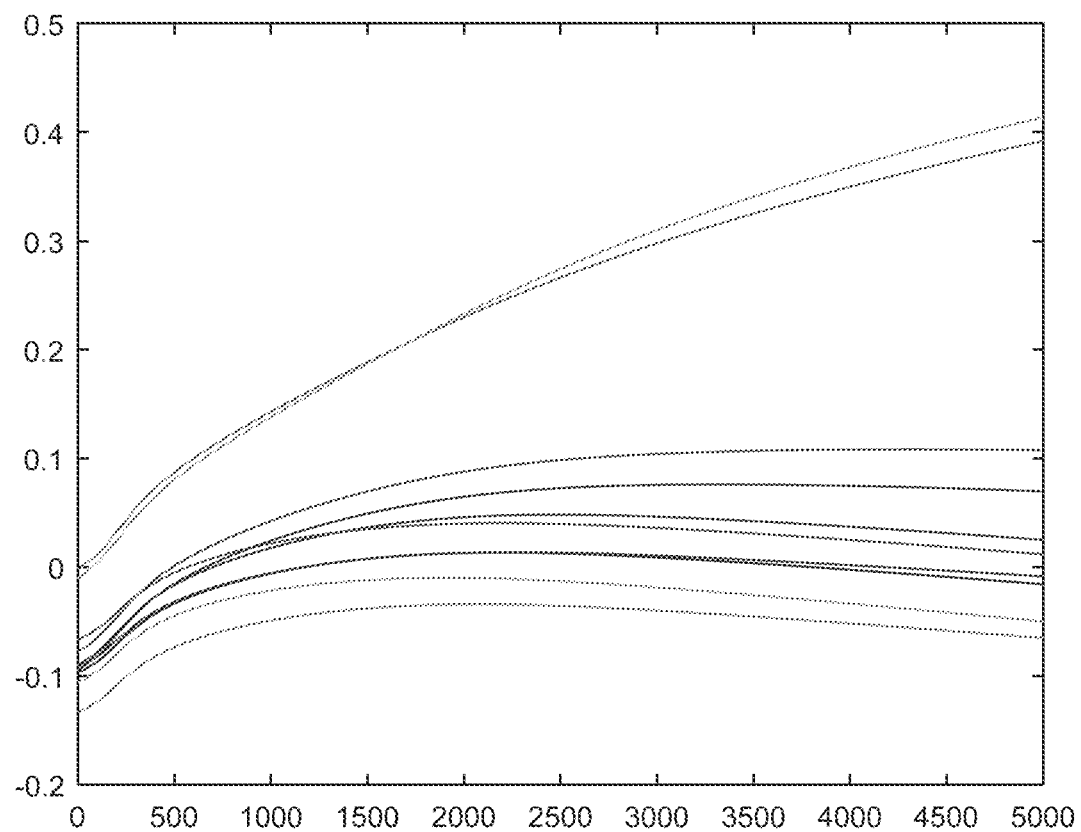
Figure 3B:
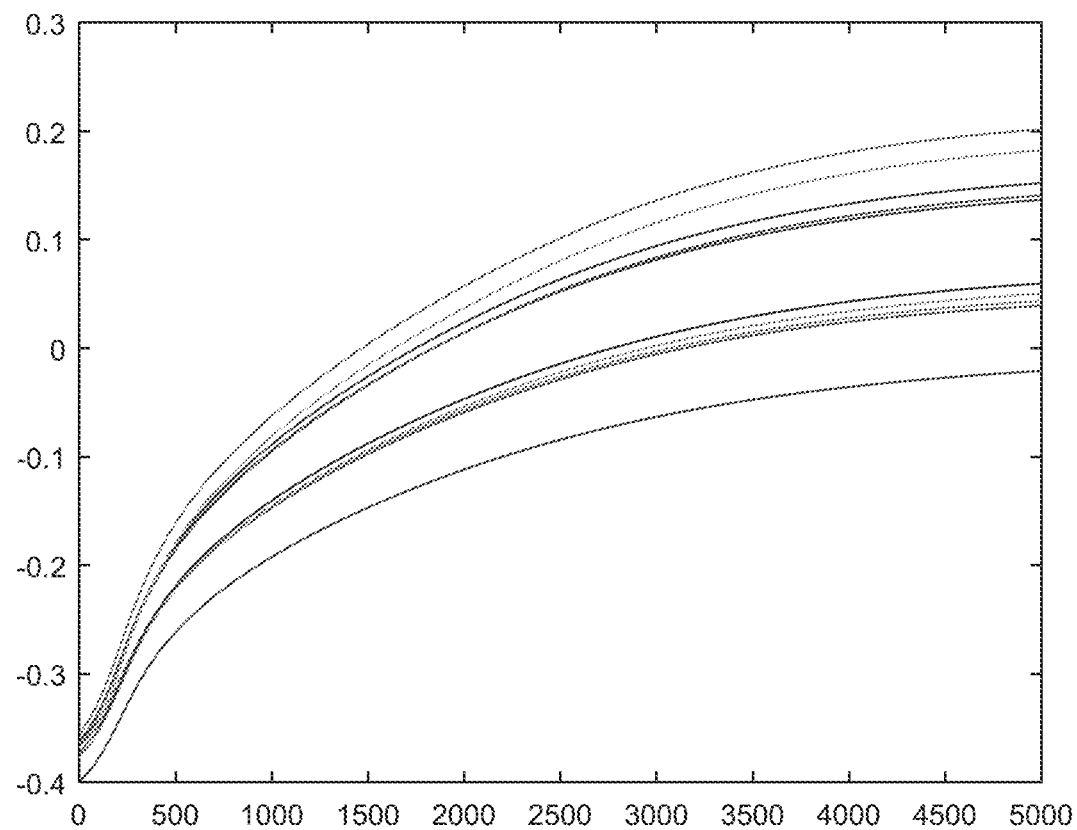

In particular, FIG. 3A shows the changes of weights between the input layer and the hidden layer 1 and the weights that connect to each feature (from left side to the right in FIG. 3A). In FIG. 3B, the first feature's weights slightly decrease at first and then increase, the second feature's weights keep decreasing, the third and fourth features increase at first then fall slightly, and weights of features five and six increase all the time. According to the previous analysis, the magnitude of feature 2 can be reduced and the importance of features 5 and 6 can be increased.

In addition, FIG. 3B demonstrates a sparse connection of the method, signifying that the learning/training process does not have over-fitting issues. It is also noted that the steps described above demonstrate how the black box uses the teacher's signal in the supervised ("fine-tuning") learning/training process, acting as a validation to facilitate a self-learning/self-training process.

Further, when the supervised ("fine-tuning") learning/training process is complete, the weights that join each feature and the black box are shown in FIG. 3B. In each sub-figure of FIG. 3B, the X axis represents about 5,000 iterations, while the Y axis represents the value of the weights. There are ten lines in each sub-figure of FIG. 3B, each representing a specific weight between one feature and a neuron in the hidden layer 1. Subsequently, by applying the same analysis, it is observed that when the weights increase, it suggests that the corresponding feature is considered to be more important than before; and when they decrease, it may suggest a wrong judgement in self-learning/self-training process. Moreover, the sparse connections suggest that weights become dispersive, otherwise it could lead to the over-fitting issues.

The results of the above steps were determined to be [0.428, 0.117, 0.143, 0.084, 0.087, 0.393], for the six features, namely, exposure, AADCT, left shoulder width, median width, right shoulder width, curve deflection, respectively. After the supervised ("fine-tuning") learning/training process is complete, as the weights updating is based on a nonlinear function, the changes of the contributions can be defined based on a sigmoid function. The results are then determined to be [0.928, −0.321, 0.688, 0.589, 0.635, 1.015] which are shown in FIG. 4 and table 2 for comparing the judgements of contributions of the features in the two learning/training stages.

Figure 4:
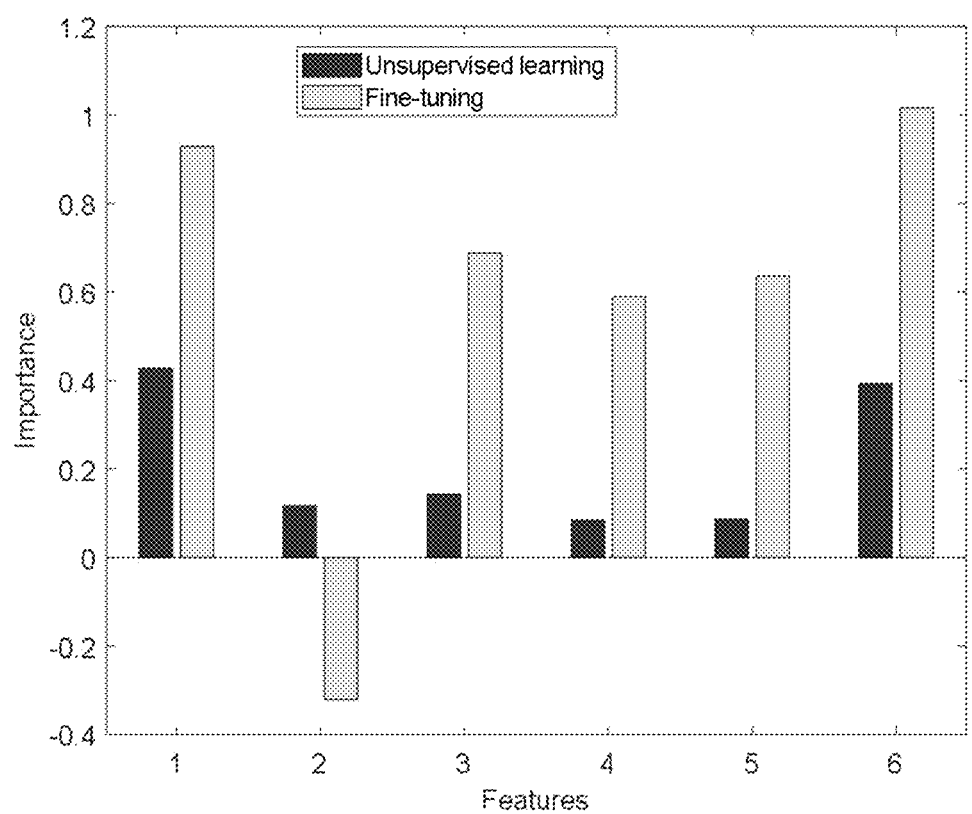
FIG. 4 shows the calculated feature importance in the two learning/training stages, according to an embodiment of the subject invention.

Referring to FIG. 4, the calculated feature importance in the two learning/training stages, namely the unsupervised learning/training stage and the supervised ("fine-turning") learning/training stage, is shown. The features 1-6 (from left to right in FIG. 4) are exposure, annual average daily commercial traffic (AADCT), left shoulder width, median width, right shoulder width, and curve deflection, respectively. In the beginning, the features 1 and 6 are determined to be significant by the self-learning/self-training process as illustrated by the blue bars. After the supervised ("fine-tuning") learning/training is performed, the results are updated and all the features become more important except the second feature, AADCT, which may be considered a distraction (negative) to the learning/training process.

Referring to Table 2, four methods including negative binomial (NB), kernel regression (KR), back propagation neural networks (BPNN), regularized deep belief network (R-DBN) are compared. The NB method is one of the most popular methods used in real-world applications, the KR and BPNN methods are two popular traditional machine learning/training methods, and the R-DBN method is an improved version of DBN which is one of the most significant methods in deep learning.

Referring to the results of Table 2, it is noted that the decoded R-DBN method of the subject invention demonstrates more excellent performance when compared to other conventional methods, and the decoded R-DBN of the subject invention outperforms the original version of R-DBN by achieving a minimal MAE value of 7.58 and a minimal RMSE value of 15.03. Based on the results, the feature importance using traditional numerical method and deep neural nets are compared in Table 2. Similar trends of the feature importance are observed to show that deep neural network not only correctly identifies the unimportant features but also makes better use of the important features.

TABLE 2

Method Testing Comparison

| Methods | Min MAE | Min RMSE | Numerical Calculated FI | DNN Unsupervised Learning FI | DNN Final FI |
|---|---|---|---|---|---|
| NB | 11.80 | 26.60 | / | / | / |
| KR | 8.85 | 17.85 | / | / | / |
| BPNN | 8.60 | 16.51 | / | / | / |
| R-DBN | 8.00 | 15.24 | 0.000 | / | / |
| R-DBN without Feature1 | 11.83 | 26.02 | 0.228 | 0.428 | 0.928 |
| R-DBN without Feature2 | 7.58 | 15.03 | −0.053 | 0.117 | −0.321 |
| R-DBN without Feature3 | 9.02 | 19.03 | 0.128 | 0.143 | 0.688 |
| R-DBN without Feature4 | 8.82 | 19.20 | 0.101 | 0.084 | 0.589 |
| R-DBN without Feature5 | 8.34 | 15.95 | 0.043 | 0.087 | 0.635 |
| R-DBN without Feature6 | 9.24 | 17.86 | 0.155 | 0.393 | 1.015 |
| R-DBN without Hid-layer2 | 9.54 | 17.21 | / | / | / |

Note: NB represents negative binomial, KR represents kernel regression, BPNN represents back propagation neural network, R-DBN represents regularized deep belief network, and FI represents feature importance.

Figure 5A:
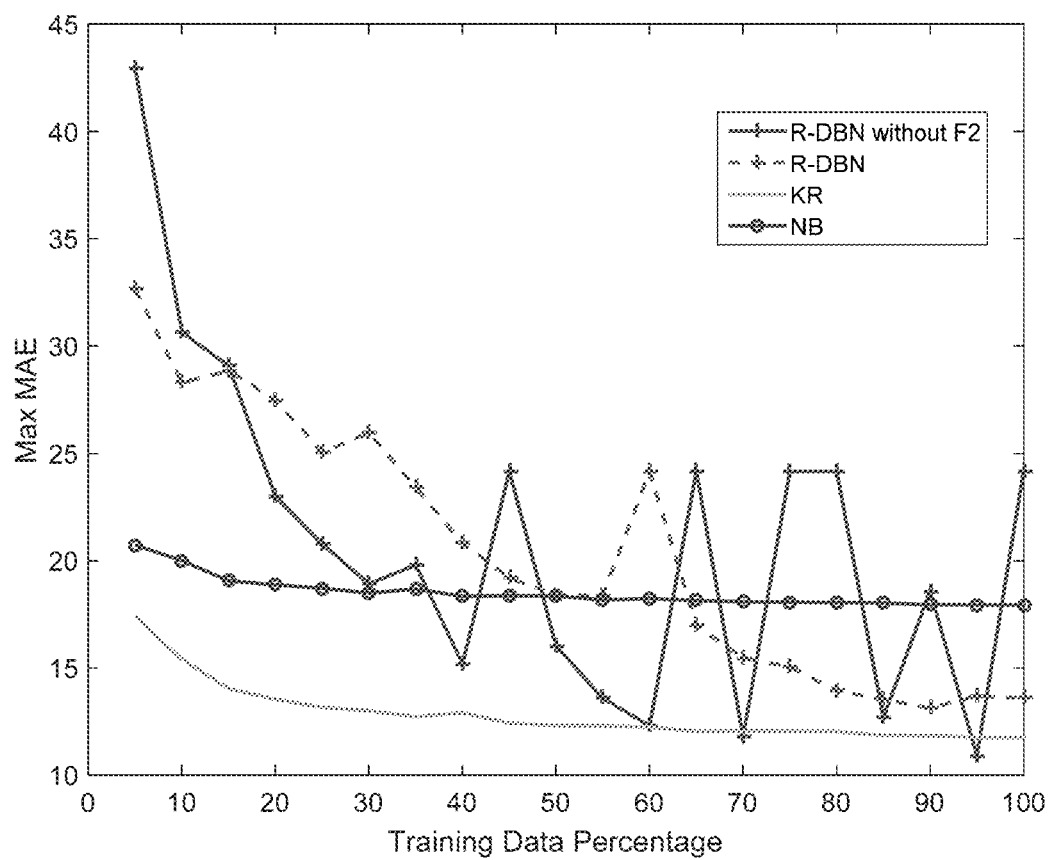
FIGS. 5A-5C show a comparison of performance between R-DBN without feature 2 and three other methods including negative binomial (NB), kernel regression (KR) and regularized deep belief network (R-DBN) with respect to data sizes, according to an embodiment of the subject invention.
Figure 5B:
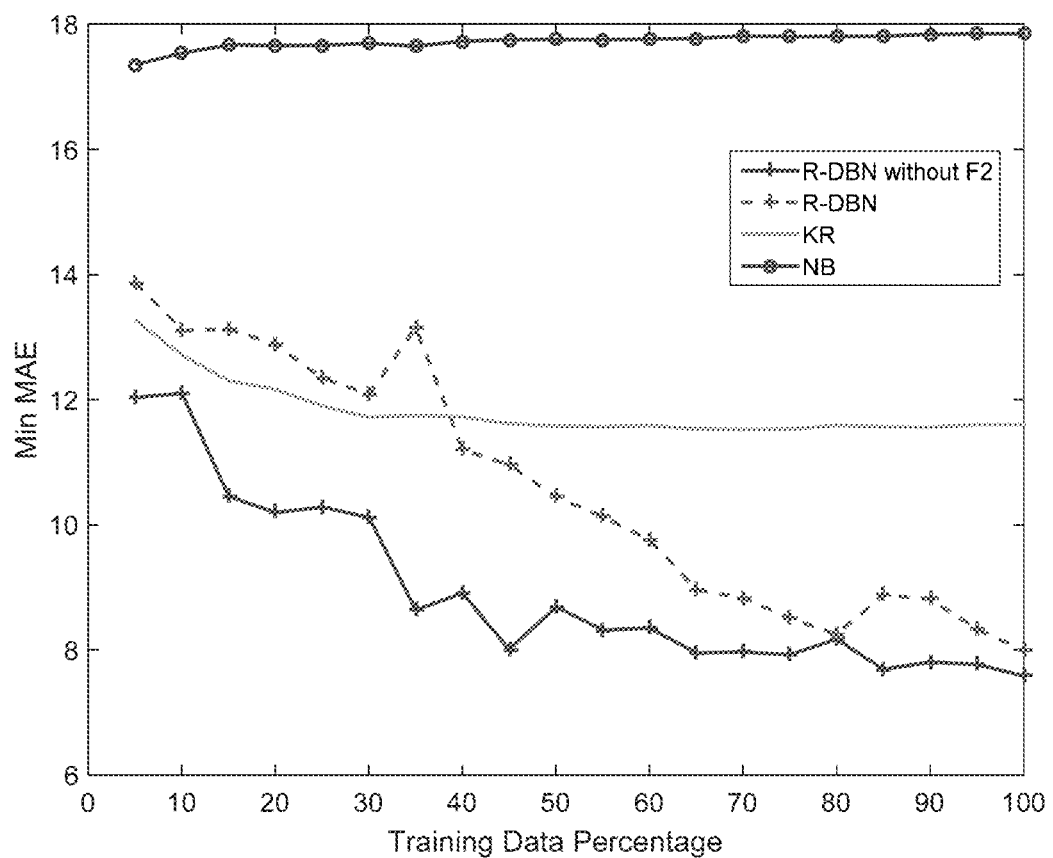
Figure 5C:
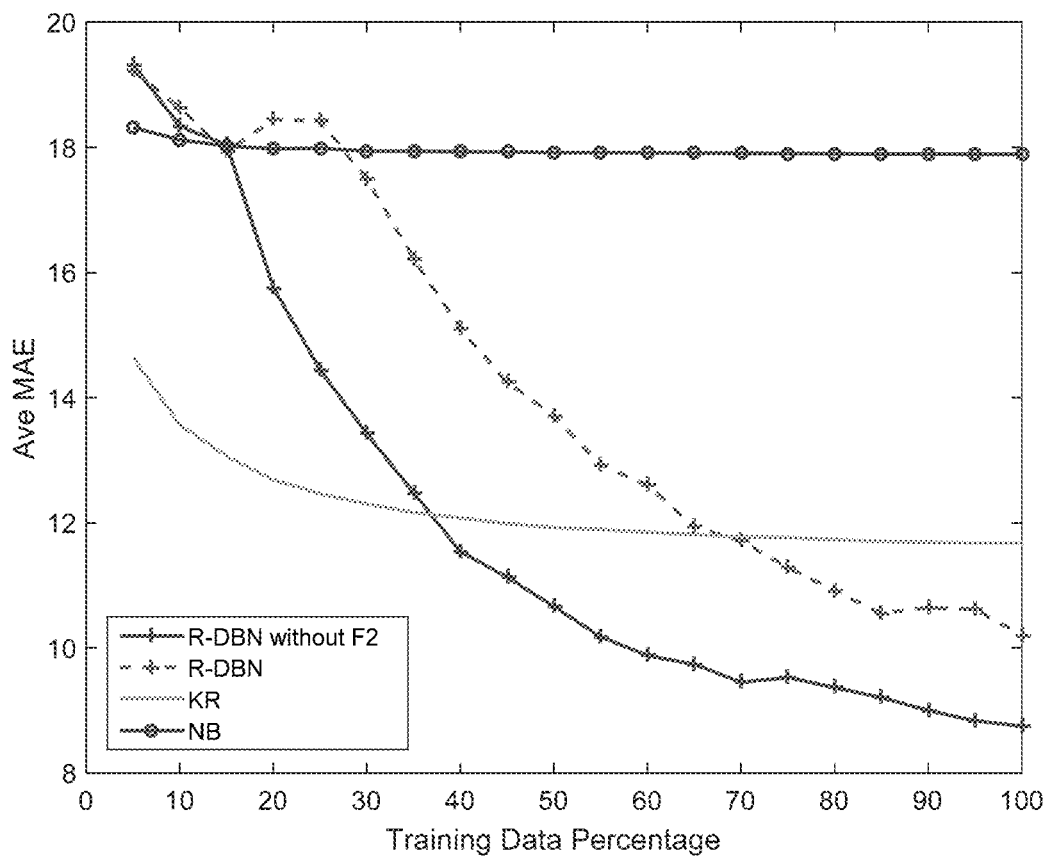

Referring to FIGS. 5A-5C, comparisons of performance between the decoded R-DBN ("R-DBN without feature 2") of the subject invention and three conventional methods including the NB method, the KR method and the original R-DBN method with respect to data sizes are shown. The performance of the NB method does not substantially change as the learning/training data increases. Similarly, for the KR method, the best results show some improvement, but eventually reach a limit. The decoded R-DBN method clearly shows an improvement, especially when the learning/training data increase. In contrast, by eliminating the unimportant feature, the decoded R-DBN method of the subject invention achieves performance much better than other conventional methods. Particularly, in FIG. 5A, the minimal testing mean absolute error (MAE) of the decoded R-DBN ("R-DBN without feature 2") of the subject invention is lower than other conventional methods in all cases. Further, in FIG. 5C, the MAE of the decoded R-DBN ("R-DBN without feature 2") of the subject invention is superior than the KR method with the learning/raining data by 40% and much faster than the original R-DBN method.

The method of the subject invention is built on visualization, feature importance and sensitivity analysis, allowing the contributions of input variables on the "black box" features of the learning/training process and the output decision to be effectively evaluated. Moreover, the method can intuitively highlight the areas that respond positively or negatively to the inputs in deep neural networks. Accordingly, the method of the subject invention enables users to understand the black box feature of the learning/training process, provides potentials to analyze the contributions of the various input features, and intuitively highlights areas respond positively or negatively to the inputs. Furthermore, how a deep neural network, especially in the unsupervised learning/training process, studies differently from other methods is demonstrated, allowing effective deciphering of the method's inner workings, identifying the important features and removing the unimportant features, such that a more accurate road safety condition can be predicted.

Thus, embodiments of the subject invention could be used in development of road safety management and alarm systems. In reality, the input dataset on which the road safety management and alarm systems are based are collected from different geographical regions, resulting in varying feature importance. The visualization, analysis, and evaluation provided by the embodiments of the subject invention help the users develop more accurate road safety status prediction. Potential exemplary applications include, but not limited to, SPF analysis, signal process filtering, and structure design filtering.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

REFERENCES

[1] A. Adadi, and M. Berrada, Peeking inside the black-box: a survey on explainable artificial intelligence (XAI). IEEE Access, vol. 1, pp. 1, 2018.
[2] S. Wojciech, T. Wiegand, and K. Müller, Explainable artificial intelligence:
understanding, visualizing and interpreting deep learning models, 2017.
[3] Y. LeCun, Y. Bengio, and G. Hinton, Deep learning. Nature, vol. 521, no. 7553, pp. 436-444, 2015.
[4] N. Papernot, P. McDaniel, I. Goodfellow, S. Jha, Z. B. Celik, and A. Swami, Practical black-box attacks against deep learning systems using adversarial examples, arXiv preprint arXiv: 1602.02697, 2016.
[5] N. Narodytska, and S. P. Kasiviswanathan, Simple black-box adversarial attacks on deep neural networks, In Proceedings of the IEEE Conference on Computer Vision and Pattern Recognition Workshops, pp. 6-14, 2017.
[6] R. Guidotti, A. Monreale, S. Ruggieri, F. Turini, F. Giannotti, and D. Pedreschi, A survey of methods for explaining black box models, ACM Computing Surveys (CSUR), vol. 51, no. 5, article. 93, 2018.
[7] D. V. Carvalho, E. M. Pereira, and J. S. Cardoso, Machine learning interpretability: a survey on methods and metrics. Electronics, vol. 8, no. 8, pp. 832, 2019.
[8] M. Du, N. Liu, X. Hu, Techniques for interpretable machine learning. arXiv 2018, arXiv:1808.00033
[9] A. Shrikumar, P. Greenside, and A. Kundaje, Learning important features through propagating activation differences, arXiv preprint arXiv:1704.02685, 2017.
[10] M. Bojarski, A. Choromanska, K. Choromanski, B. Firner, L. Jackel, UrsMuller, and K. Zieba, VisualBackProp: Visualizing CNNs for autonomous driving, CoRR, vol. abs/1611.05418, 2016.
[11] M. D. Zeiler, and R. Fergus, Visualizing and understanding convolutional networks, In European Conference on Computer Vision, pp. 818-833, 2014.
[12] W. Samek, A. Binder, G. Montavon, S. Lapuschkin, and K. R. Müller, Evaluating the visualization of what a deep neural network has learned, IEEE Transactions on Neural Networks and Learning Systems, vol. 28, no. 11, pp. 2660-2673, 2017.
[13] M. F. Hohman, M. Kahng, R. Pienta, and D. H. Chau. Visual analytics in deep learning: An interrogative survey for the next frontiers. IEEE transactions on visualization and computer graphics, pp. 1-20, 2018.
[14] M. F. Hohman, H. Park, C. Robinson, and D. H. Chau. Summit: Scaling deep learning interpretability by visualizing activation and attribution summarizations. IEEE Transactions on Visualization and Computer Graphics (TVCG). Vancouver, Canada, 2020.
[15] R. Garcia. A task-and-technique centered survey on visual analytics for deep learning model engineering. Computers and Graphics, vol. 77, pp. 30-49, 2018.
[16] R. Shwartz-Ziv, and N. Tishby, Opening the black box of deep neural networks via information, arXiv preprint arXiv:1703.00810, 2017.
[17] P. W. Koh, and P. Liang, Understanding black-box predictions via influence functions, In Proceedings of the 34th International Conference on Machine Learning, pp. 1885-1894, 2017.
[18] J. Thiagarajan, B. Kailkhura, P. Sattigeri, and K. Ramamurthy, Tree-View: peeking into deep neural networks via feature-space partitioning, arXiv preprint arXiv:1611.07429, 2016.
[19] Y. Lee, A. Scolari, B. Chun, M. D. Santambrogio, M. Weimer, and M. Interlandi, PRETZEL: opening the black box of machine learning prediction serving systems, In 13th USENIX Symposium on Operating Systems Design and Implementation, pp. 611-626, 2018.
[20] M. Honegger, Shedding light on black box machine learning algorithms: development of an axiomatic framework to assess the quality of methods that explain individual predictions, arXiv preprint arXiv:1808.05054, 2018.
[21] Guangyuan Pan a, Liping Fu a,b, ⁂, Lalita Thakali, Development of a global road safety performance function using deep neural networks, International Journal of Transportation Science and Technology 6 (2017) 159-173.

We claim:

1. A method for visualizing and analyzing contributions of various input features for traffic safety status prediction, comprising steps of:
   1) initializing a deep belief network (DBN) with input features;
   2) performing unsupervised learning/training by observing changes of weights of the input features during the unsupervised learning/training;
   3) when the unsupervised learning/training is complete, performing supervised learning/training by generating a reconstructed input layer based on results of each hidden layer; and
   4) continually running the supervised learning/training and generating a weight diagram based on both visualization and numerical analysis that calculates contributions of the input features, wherein the contribution of each of the input features is defined by a linear function shown in following Equation:

$$Fl_i = Fl_i^{unsup} + Fl_i^{sup}$$

wherein $Fl_i$ is importance of an input feature i, $Fl_i^{unsup}$ is importance of the input feature i obtained from the unsupervised learning/training, and $Fl_i^{sup}$ is importance of the input feature i obtained from the supervised learning/training.

2. The method of claim 1, wherein the initializing a deep belief network (DBN) comprises pre-setting the DBN with a V-H1-H2-O structure, wherein V represents input neurons, H1 and H2 represent hidden neurons in two hidden layers, respectively, and O represents output for prediction, and wherein weights are randomly pre-set.

3. The method of claim 1, wherein the observing changes of weights during unsupervised learning/training is performed with a focus on magnitude of each input feature.

4. The method of claim 2, wherein the performing unsupervised learning/training comprises training a first restricted Boltzmann (RBM) machine comprising the input neurons V and the hidden neurons in the first hidden layer H1 based on greedy unsupervised learning/training.

5. The method of claim 1, wherein the generating a reconstructed input layer based on each hidden layer is performed by differentiating an activation area and a non-activation area.

6. The method of claim 1, wherein the supervised learning/training comprises generating a diagram of the weights such that whether a secondary consideration of the method is determined to exist after it is taught by a teacher.

7. The method of claim 6, wherein if the secondary consideration is determined to exist, a resulting image different from a resulting image of the unsupervised learning/training is generated.

8. The method of claim 1, wherein the numerical analysis that calculates contributions of input features determines whether the input feature is accepted or rejected.

9. The method of claim 1, wherein when the performing unsupervised learning/training or the performing supervised learning/training is complete, results of the learning/training are evaluated based on values of mean absolute error (MAE) and values of root mean square error (RMSE).

10. The method of claim 1, wherein the input features comprise one or more of annual average daily commercial traffic (AADCT), median width, left shoulder width, right shoulder width, curve deflection, and exposure for traffic safety status prediction.

11. A non-transitory computer-readable medium comprising program instructions stored thereon that, when executed, cause a processor to perform a method for visualizing and analyzing contributions of various input features for traffic safety status prediction, the method comprising steps of:
   1) initializing a deep belief network (DBN) with input features;
   2) performing unsupervised learning/training by observing changes of weights of the input features during the unsupervised learning/training;
   3) when the unsupervised learning/training is complete, performing supervised learning/training by generating a reconstructed input layer based on results of each hidden layer; and
   4) continually running the supervised learning/training and generating a weight diagram based on both visualization and numerical analysis that calculates contributions of the input features, wherein the contribution of each of the input features is defined by a linear function shown in the following Equation:

$$Fl_i = Fl_i^{unsup} + Fl_i^{sup}$$

wherein $Fl_i$ is importance of an input feature i, $Fl_i^{unsup}$ is importance of the input feature i obtained from the unsupervised learning/training, and $Fl_i^{sup}$ is importance of the input feature i obtained from the supervised learning/training.

12. The non-transitory computer-readable medium of claim 11, wherein the initializing a deep belief network (DBN) comprises pre-setting the DBN with a V-H1-H2-O structure, wherein V represents input neurons, H1 and H2 represent hidden neurons in two hidden layers, respectively, and O represents output for prediction, and wherein weights are randomly pre-set.

13. The non-transitory computer-readable medium of claim 11, wherein the observing changes of weights during unsupervised learning/training is performed with a focus on magnitude of each input feature.

14. The non-transitory computer-readable medium of claim 12, wherein the performing unsupervised training comprises training a first restricted Boltzmann (RBM) machine comprising the input neurons V and the hidden neurons in the first hidden layer H1 based on greedy unsupervised learning/training.

15. The non-transitory computer-readable medium of claim 11, wherein the generating a reconstructed input layer based on each hidden layer is performed by differentiating an activation area and a non-activation area.

16. The non-transitory computer-readable medium of claim 11, wherein the supervised learning/training comprises generating a diagram of the weights such that whether a secondary consideration of the method is determined to exist after it is taught by a teacher.

17. The non-transitory computer-readable medium of claim 16, wherein if the secondary consideration is determined to exist, a resulting image different from a resulting image of the unsupervised learning/training is generated.

18. The non-transitory computer-readable medium of claim 11, wherein the numerical analysis that calculates contributions of input features determines whether the input feature is accepted or rejected.

19. The non-transitory computer-readable medium of claim 11, wherein when the performing unsupervised learning/training or the performing supervised learning/training is complete, results of the training are evaluated based on values of mean absolute error (MAE) and values of root mean square error (RMSE).

20. The non-transitory computer-readable medium of claim 11, wherein the input features comprises one or more of annual average daily commercial traffic (AADCT), median width, left shoulder width, right shoulder width, curve deflection, and exposure for traffic safety status prediction.

* * * * *